(12) United States Patent
Angell et al.

(10) Patent No.: US 8,273,477 B2
(45) Date of Patent: Sep. 25, 2012

(54) INORGANIC SALT MIXTURES AS ELECTROLYTE MEDIA IN FUEL CELLS

(75) Inventors: Charles Austen Angell, Mesa, AZ (US); Jean-Philippe Belieres, Renton, WA (US); Dominic Francis-Gervasio, Fountain Hills, AZ (US)

(73) Assignee: Arizona Board of Regents for and on behalf of Arizona State University, Scottsdale, AZ (US)

( * ) Notice: Subject to any disclaimer, the term of this patent is extended or adjusted under 35 U.S.C. 154(b) by 596 days.

(21) Appl. No.: 12/513,148

(22) PCT Filed: Oct. 31, 2007

(86) PCT No.: PCT/US2007/083237
§ 371 (c)(1),
(2), (4) Date: Apr. 30, 2009

(87) PCT Pub. No.: WO2008/118210
PCT Pub. Date: Oct. 2, 2008

(65) Prior Publication Data
US 2010/0055509 A1 Mar. 4, 2010

Related U.S. Application Data

(60) Provisional application No. 60/863,760, filed on Oct. 31, 2006.

(51) Int. Cl.
*H01M 6/04* (2006.01)
*H01M 6/20* (2006.01)
*H01M 8/00* (2006.01)
*H01M 8/06* (2006.01)

(52) U.S. Cl. ............ 429/188; 105/400; 105/408
(58) Field of Classification Search .......... None
See application file for complete search history.

(56) References Cited

U.S. PATENT DOCUMENTS 6,630,265 B1 * 10/2003 Taft et al. ............ 429/491
2004/0048129 A1  3/2004 Taft, III et al.
2007/0026295 A1  2/2007 Angell et al.

FOREIGN PATENT DOCUMENTS

JP   2004-079505  3/2004
WO  WO 2004/114445  12/2004

(Continued)

OTHER PUBLICATIONS

International Search Report and Written Opinion dated Dec. 12, 2008 for PCT/US2007/083237, filed on Oct. 31, 2007, 13 pages.

(Continued)

*Primary Examiner* — Emily Le
*Assistant Examiner* — Sarah A Slifka
(74) *Attorney, Agent, or Firm* — Fish & Richardson P.C.

(57) ABSTRACT

Fuel cell designs and techniques for converting chemical energy into electrical energy uses a fuel cell are disclosed. The designs and techniques include an anode to receive fuel, a cathode to receive oxygen, and an electrolyte chamber in the fuel cell, including an electrolyte medium, where the electrolyte medium includes an inorganic salt mixture in the fuel cell. The salt mixture includes pre-determined quantities of at least two salts chosen from a group consisting of ammonium trifluoromethanesulfonate, ammonium trifluoroacetate, and ammonium nitrate, to conduct charge from the anode to the cathode. The fuel cell includes an electrical circuit operatively coupled to the fuel cell to transport electrons from the cathode.

34 Claims, 10 Drawing Sheets

FOREIGN PATENT DOCUMENTS

| WO | WO 2005/071779 | 8/2005 |
|---|---|---|
| WO | WO 2005/109562 | 11/2005 |
| WO | WO 2008/118210 | 10/2008 |

OTHER PUBLICATIONS

Angell, C.A. and D.B. Helphrey, "Corresponding states and the glass transition for alkali metal nitrates," J. Phys. Chem. 75: 2306-2312 (1971).

Angell, C.A. et al., "Physical Chemistry of Ionic Liquids, Inorganic and Organic, Protic and Aprotic," Chapter 2 in *Electrochemical Aspects of Ionic Liquids*, Edited by H. Ohno, New Jersey: John Wiley & Sons, Inc., 2005, pp. 5-23.

Baston, G.M.N. et al., "Ionic Liquids for the Nuclear Industry: A Radiochemical, Structural, and Electrochemical Investigation," Chapter 13 in *Ionic Liquids:: Industrial Applications for Green Chemistry*, Edited by R.D. Rogers and K.R. Seddon, ACS Symp. Ser., American Chemical Society, Washington, DC, USA, 2002, vol. 818, p. 162-177.

Belieres, J.P. et al., "Binary inorganic salt mixtures as high conductivity liquid electrolytes for >100° C fuel cells," Chem. Commun , pp. 4799-4801, 2006.

Gervasio, D. et al., Proton Transfer Salts: A New Class of Solvent-Free, Involatile, Fuel Cell Electrolytes, Prepr. Pap.-Am. Chem. Soc. Div. Fuel Chem., 51(2): 656-657, 2006.

Kreuer, K.D. et al., "Imidazole and pyrazole-based proton conducting polymers and liquids," Electrochimica. Acta., vol. 43, Nos. 10-11, pp. 1281-1288 (1998).

Matsui, T. et al., "Proton-Conductive Electrolyte Consisting of $NH_4PO_3/TiP_2O_7$ for Intermediate-Temperature Fuel Cells," Journal of the Electrochemical Society, vol. 152(1), p. A167-A170, (2005).

Matsuoka, H. et al., "Bronsted acid-base and—polybase complexes as electrolytes for fuel cells under non-humidifying conditions," Electrochimica Acta, vol. 50, pp. 4015-4021, (2005).

Rogers, R.D. and K.R. Seddon, "Ionic Liquids—Solvents of the Future," Science, vol. 302, No. 5646, pp. 792-793 (2003).

Susan, M.A.B.H. et al., "Bronsted acid-base ionic liquids and their use as new materials for anhydrous proton conductors," Chem. Commun, pp. 938-939 (2003).

Sutter, E.J. and C.A. Angell, "Glass Transitions in Molecular Liquids. I. Influence of Proton Transfer Processes in Hydrazine-Based Solutions," Journal of Physsical Chemistry, vol. 75, No. 12, pp. 1826-1833 (1971).

Wang, P. et al., "A Binary Ionic Liquid Electrolyte to Achieve >7% Power Conversion Efficiencies in Dye-Sensitized Solar Cells," Chem Mater. 16: 2694-2696 (2004).

Xu, W. and C.A. Angell, "Solvent-Free Electrolytes with Aqueous Solution-Like Conductivities," Science, vol. 302, pp. 422-425, (2003).

Yeager, E. et al., "The Electrolyte Factor in $O_2$ Reduction Electrocatalysis," Proceedings of the Workshop on Structural Effects in Electrocatalysis and Oxygen Electrochemisty, Oct. 29-Nov. 1, 1991, vol. 92-11, p. 440-473, (1992).

Yoshizawa, M. et al., "Design on New Ionic Liquids by Neutralization of Imidazole Derivatives with Imide-Type Acids," Electrochemical and Solid-State Letters, vol. 4, No. 6., pp. E25-E27 (2001).

Yoshizawa, M. et al., "Ionic Liquids by Proton Transfer, δPKA, and the Ionic Liquid Fuel Cell," Abstracts of Papers, 226th Am. Chem. Soc. National Meeting, Abstract No. 83 (Sep. 7-11, 2003).

Yoshizawa, M. et al., "Ionic Liquids by Proton Transfer: Vapor Pressure, Conductivity, and the Relevance of $\Delta pK_a$ from Aqueous Solutions," J. Am Chem. Soc. 125: 15411-15419 (2003).

Yoshizawa, M. et al., "Preparation and Properties of Polymerized Ionic Liquids as Film Electrolytes," Abstracts of Papers, 226th Am. Chem. Soc. National Meeting, Abstract No. 154 (Sep. 7-11, 2003).

Yoshizawa, M. et al., "Zwittering-Liquid-In-Polymer Electrolytes," Abstracts of Papers, $226^{th}$ Am. Chem. Soc. National Meeting, Abstract No. 140 (Sep. 7-11, 2003).

Yoshizawa, M. et al., "Zwitterionic Liquids as Non-Volatile and Non-Migrate Solvents Under Potential Gradient," Abstracts of Papers, 226th Am. Chem. Soc. National Meeting, Abstract No. 152 (Sep. 7-11, 2003).

\* cited by examiner

INORGANIC SALT MIXTURES AS ELECTROLYTE MEDIA IN FUEL CELLS

CROSS-REFERENCE TO RELATED APPLICATIONS

This application is a national stage application of and claims the benefit of PCT Application No. PCT/US2007/083237, filed on Oct. 31, 2007, and published as WO 2008/118210, which claims priority to U.S. Provisional Application Ser. No. 60/863,760, filed on Oct. 31, 2006, and entitled "Binary Inorganic Salt Mixtures as High Conductivity Liquid Electrolytes for >100° C. Fuel Cells". The disclosure of the prior applications is considered part of (and is incorporated by reference in) the disclosure of this application.

STATEMENT REGARDING FEDERALLY-SPONSORED RESEARCH OR DEVELOPMENT

This invention was made with government support under Grant Number W911NF-04-1-0060, awarded by the Army Research Office, and Grand Number NNCo4GBo68, awarded by NASA. The government has certain rights in the invention.

TECHNICAL FIELD

This disclosure relates to electrochemical cells, including fuel cells.

BACKGROUND

Fuel cells are electrochemical devices that convert chemical energy directly into electric energy. So long as a fuel, such as oxygen, is supplied to the electrodes, electric energy and some heat are produced. The reactants (e.g., fuel and oxygen) flow into the fuel cell, the reaction products (e.g., water) flow out of the cell, and the electrolyte medium remains in the fuel cell. Fuel cells find application in power stations for on-site power generation, automotive industry, transportation, mobile communications, and the like.

SUMMARY

This disclosure describes technologies relating to the use of inorganic salts containing ammonium cations as electrolyte media in fuel cells.

In one aspect, a system for converting chemical energy into electrical energy is described. The system includes a fuel cell including an anode to receive a fuel, a cathode to receive oxygen, and an electrolyte chamber in the fuel cell including an electrolyte medium, the electrolyte medium including an inorganic salt mixture, the salt mixture including pre-determined quantities of at least two salts chosen from a group consisting of ammonium trifluoromethanesulfonate ($NH_4Tf$), ammonium trifluoroacetate ($NH_4TFAc$), and ammonium nitrate ($NH_4NO_3$), to conduct charge from the anode to the cathode, and an electrical circuit operatively coupled to the fuel cell to conduct electric current from the anode to the cathode.

This, and other aspects, can include one or more of the following features. The salt mixture can consist of $NH_4TFAc$ and $NH_4NO_3$. The salt mixture can consist of $NH_4Tf$ and $NH_4NO_3$. The salt mixture can consist of 60% $NH_4NO_3$ and 40% $NH_4TFAc$ by weight. The electrolyte medium can include a liquid component in the salt mixture. The liquid component can not include ammonium. The salt mixture can include on or more additional salts, each additional salt including an ammonium cation.

In another aspect, an electrolyte medium for conducting charge from an anode to a cathode in a fuel cell is described. The electrolyte medium includes inorganic salt mixture, the salt mixture including pre-determined quantities of at least two salts chosen from a group consisting of ammonium trifluoromethanesulfonate ($NH_4Tf$), ammonium trifluoroacetate ($NH_4TFAc$), and ammonium nitrate ($NH_4NO_3$), to conduct charge from the anode to the cathode, and an electrical circuit operatively coupled to the fuel cell to transport electrons from the cathode.

This, and other aspects, can include one or more of the following features. The salt mixture can consist of $NH_4TFAc$ and $NH_4NO_3$. The salt mixture can consist of $NH_4Tf$ and $NH_4NO_3$. The salt mixture can consist of 60% $NH_4NO_3$ and 40% $NH_4TFAc$ by weight. The electrolyte medium can include a liquid component in the salt mixture. The liquid component can not include ammonium. The salt mixture can include on or more additional salts, each additional salt including an ammonium cation.

In another aspect, a method of converting chemical energy into electrical energy using a fuel cell is described. The method includes supplying a fuel to an anode in the fuel cell, supplying oxygen to a cathode in the fuel cell, and using an electrolyte medium in an electrolyte chamber in the fuel cell, the electrolyte medium including an inorganic salt mixture, the salt mixture including pre-determined quantities of at least two salts chosen from a group consisting of ammonium trifluoromethanesulfonate ($NH_4Tf$), ammonium trifluoroacetate ($NH_4TFAc$), and ammonium nitrate ($NH_4NO_3$), to conduct charge from the anode to the cathode.

This, and other aspects, can include one or more of the following features. The salt mixture can consist of $NH_4Tf$ and $NH_4TFAc$. The salt mixture can consist of $NH_4TFAc$ and $NH_4NO_3$. The salt mixture can consist of $NH_4Tf$ and $NH_4NO_3$. The salt mixture can consist of 60% $NH_4NO_3$ and 40% $NH_4TFAc$ by weight. The electrolyte medium can include a liquid component in the salt mixture. The liquid component can not include ammonium. The salt mixture can include on or more additional salts, each additional salt including an ammonium cation.

In another aspect, a fuel cell is described. The fuel cell includes an anode to receive fuel, a cathode to receive oxygen, and an electrolyte chamber in the fuel cell including an electrolyte medium, the electrolyte medium including an inorganic salt mixture, the salt mixture including pre-determined quantities of at least two salts chosen from a group consisting of ammonium trifluoromethanesulfonate ($NH_4Tf$), ammonium trifluoroacetate ($NH_4TFAc$), and ammonium nitrate ($NH_4NO_3$), to conduct charge from the anode to the cathode, and an electrical circuit operatively coupled to the fuel cell to transport electrons from the cathode.

This, and other aspects, can include one or more of the following features. The salt mixture can consist of $NH_4TFAc$ and $NH_4NO_3$. The salt mixture can consist of $NH_4Tf$ and $NH_4NO_3$. The salt mixture can consist of 60% $NH_4NO_3$ and 40% $NH_4TFAc$ by weight. The electrolyte medium can include a liquid component in the salt mixture. The liquid component can not include ammonium. The salt mixture can include on or more additional salts, each additional salt including an ammonium cation.

In another aspect, a system for converting chemical energy into electrical energy is described. The system includes a fuel cell including an anode to receive a fuel, a cathode to receive oxygen, and an electrolyte chamber in the fuel cell including an electrolyte medium in contact with the anode and the cathode, the electrolyte medium including an inorganic salt mixture, the salt mixture including pre-determined quantities of at least two salts, wherein the salts are formed by a transfer of a proton to a nitrogenic inorganic base, to conduct charge from the anode to the cathode, and an electrical circuit operatively coupled to the fuel cell to conduct electric current from the anode to the cathode.

This, and other aspects, can include one or more of the following features. The salts can be chosen from a group consisting of ammonium trifluoromethanesulfonate ($NH_4Tf$), ammonium trifluoroacetate ($NH_4TFAc$), and ammonium nitrate ($NH_4NO_3$), to conduct charge from the anode to the cathode. The nitrogenic inorganic base can include one of hydrazine, methyl hydrazine, and fluorosulfonylamine.

Particular implementations of the subject matter described in this specification can be implemented to realize one or more of the following advantages. Fuel cells that use inorganic binary salt mixtures containing ammonium cations in the electrolyte medium demonstrate performance comparable with that of the phosphoric acid fuel cells. Corrosion of electrodes due to the use of acidic or basic electrolyte media can be avoided since the electrolyte media containing binary salt mixtures containing ammonium cations can be neutral. Despite the neutral characteristic, the electrolyte medium can still be highly conducting and effective as proton carriers. In addition, the neutral characteristic of the electrolyte medium allows for simplified fuel cell construction and for the use of catalysts other than noble metals, including heat-stable enzymes, and any catalyst that can aid in the oxygen reduction process. Polymer forms of the electrolytes, where all the ions are covalently and electrostatically immobilized can eliminate the possibility of an ionic short between the fuel and oxygen electrodes. The ionic liquid electrolytes can act as electrode shields in electrosynthesis, where the ionic liquid can enable continuous plating of the electrode metal.

The details of one or more implementations are set forth in the accompanying drawings and the description below. Other features, aspects, and advantages will be apparent from the description and drawings, and from the claims.

DESCRIPTION OF DRAWINGS

Like reference symbols in the various drawings indicate like elements.

DETAILED DESCRIPTION

Figure 1:
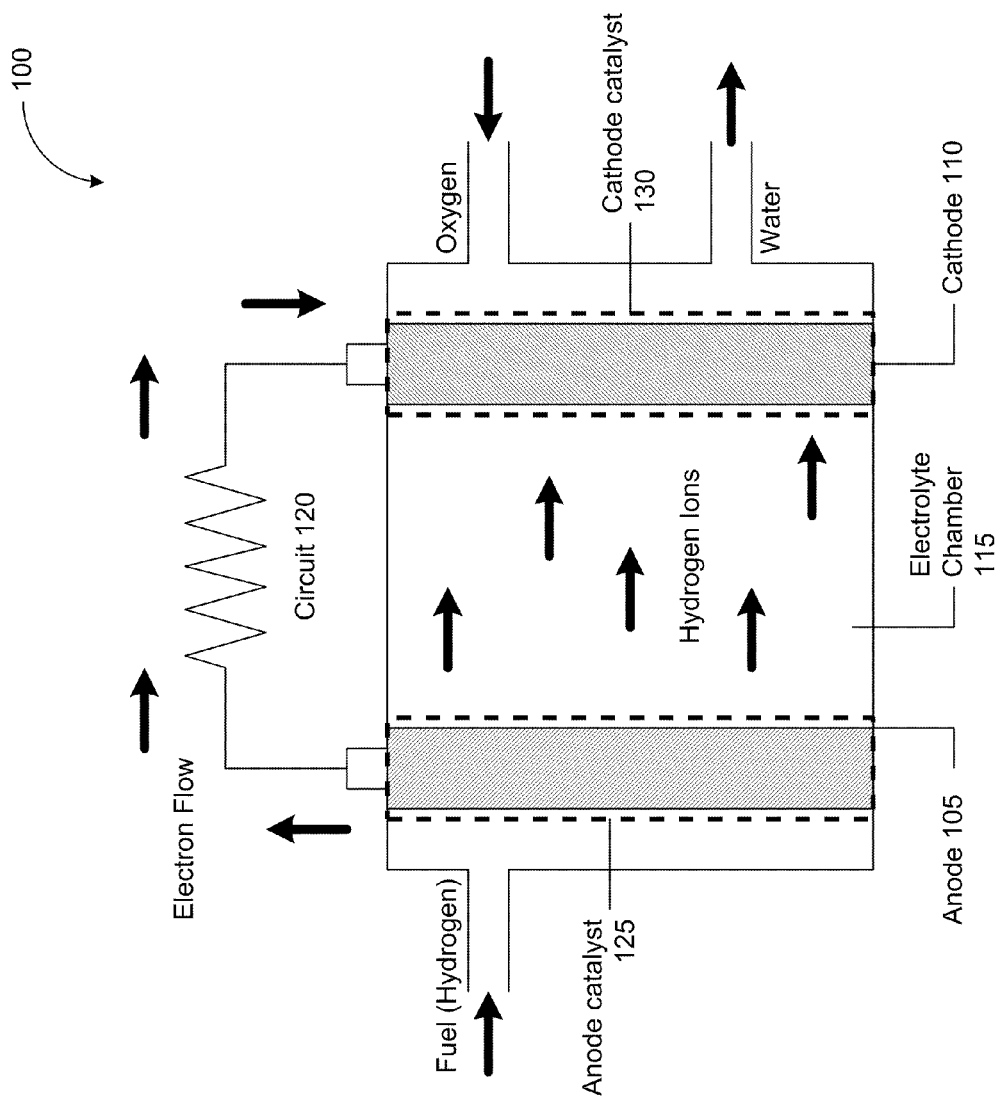
FIG. 1 is a schematic of an example of a fuel cell.

FIG. 1 depicts a schematic of an example of a fuel cell 100 for converting chemical energy into electrical energy. The fuel cell 100 includes an anode 105, a cathode 110, an electrolyte medium 115, and a circuit 120. In addition, the fuel cell 100 includes an inlet for supplying fuel (e.g., hydrogen) to the anode 105, an inlet for supplying oxidant (e.g., oxygen) to the cathode 110, and an outlet for transporting water, a byproduct of the reaction in the fuel cell 100, away from the fuel cell 100. In some implementations, the fuel cell 100 can use hydrogen as fuel and oxygen as oxidant which react in the presence of the electrolyte medium 115. In other implementations, the fuel can include hydrocarbons, ammonia, and alcohols, and the oxidants can include air, chlorine, bromine, and chlorine dioxide.

The fuel cell 100 includes an anode catalyst 125 and a cathode catalyst 130 adjacent to the anode 105 and the cathode 110, respectively. The catalyst can be platinum or one of ruthenium, osmium, platinum-ruthenium alloy, platinum-osmium alloy, platinum-palladium alloy, a platinum alloy, non-noble metals like Nickel, and the like. The anode 105 and the cathode 110 are placed adjacent to the anode catalyst 125 and the cathode catalyst 130, respectively. The electrode substrates can include carbon paper, carbon cloth, carbon felt, metals, conducting metal oxides, silicon, and the like. The electrode substrates can support the catalyst, and enable a reaction fluid to diffuse in the catalyst layer. The anode 105 and the cathode 110 can, further, include microporous layers in order to increase the reactant diffusion effects between the electrode substrate and catalyst layer. The anode 105 and the cathode 110 are each connected to a circuit 120, which, in turn, can be connected to a load (not shown), to provide electrical power, obtained from the fuel cell, to the load. For example, the circuit 120 can power a load such as a mobile phone, an automobile motor, an industrial load, and the like. The fuel cell 100 includes an electrolyte chamber 115 to hold an electrolyte medium, which carries electrically charged particles from the anode 105 to the cathode 110.

The fuel cell 100 uses the anode 105 to receive fuel and the cathode 110 to receive oxygen. The electrolyte chamber 115, between the anode 105 and the cathode 110, is used to store an electrolyte medium which conducts electric charge between the electrodes. The electrolyte medium includes an inorganic salt mixture. The salt mixture includes pre-determined quantities of at least two salts, where each salt in the inorganic salt mixture is chosen from a group consisting of ammonium trifluoromethanesulfonate ($NH_4Tf$), ammonium trifluoroacetate ($NH_4TFAc$), and ammonium nitrate ($NH_4NO_3$), to conduct charge from the anode to the cathode. In some implementations, the binary salt mixture in the electrolyte medium in the fuel cell 100 can consist of $NH_4Tf$ and $NH_4TFAc$. In other implementations, the binary salt mixture in the electrolyte medium in the fuel cell can consist of $NH_4TFAc$ and $NH_4NO_3$. In other implementations, the binary salt mixture in the electrolyte medium in the fuel cell 100 can consist of $NH_4Tf$ and $NH_4NO_3$. In such implementations, the salt mixture can include 60% $NH_4NO_3$ and 40% $NH_4Tf$, by weight.

A fuel cell is a device in which a fuel, like hydrogen, is spontaneously oxidized at the anode, which is the source of electron current from anode to cathode in an external circuit with load, e.g., a machine. The basic physical structure or building block of a fuel cell consists of an electrolyte layer separating a fuel-fed anode and an oxidantfed cathode. Hydrogen gas is fed continuously to the anode (negative electrode) compartment and air is fed continuously to the cathode (positive electrode) compartment. Electrochemical reactions taking place at the electrodes cause ions, e.g., protons, to flow from anode to cathode through electrolyte thereby completing a current loop and producing an electric current and a cell voltage. An oxidant, like oxygen, is spontaneously reduced at the cathode. Typically oxygen is the sink of electrons and protons, produced at the anode, to complete reaction forming the desired electrical energy plus pure water. Any substance that is capable of chemical oxidation and can be supplied continuously as a fluid can be used at the anode of a fuel cell. The oxidant can be any fluid that can be reduced at a sufficient rate. Table 1 shows some electrochemical properties (theoretical reversible cell potential values under standard conditions, with oxygen as oxidant) of several potential fuels. Each one of these fuels can be used in the fuel cell. In Table 1, "n" represents the number of electrons exchanged during the reaction.

TABLE 1

| Electrochemical properties of fuels with oxygen as oxidant | | | | |
|---|---|---|---|---|
| Fuel | Reaction | n | $\Delta \bar{g}_{298.15K}^{\circ}$ kJ.mol$^{-1}$ | $E_{rev}^{\circ}$ V |
| $H_2$ | $H_2(g) + \frac{1}{2}O_2(g) \rightarrow H_2O(l)$ | 2 | −237.190 | 1.229 |
| $CH_3OH$ | $CH_3OH(g) + \frac{3}{2}O_2(g) \rightarrow CO_2(g) + 2H_2O(l)$ | 6 | −702.468 | 1.213 |
| $C_2H_5OH$ | $C_2H_5OH(l) + 3O_2(g) \rightarrow 2CO_2(g) + 3H_2O(l)$ | 12 | −1325.668 | 1.145 |
| $CH_4$ | $CH_4(g) + 2O_2(g) \rightarrow CO_2(g) + 2H_2O(l)$ | 8 | −818.001 | 1.060 |
| CO | $CO(g) + \frac{1}{2}O_2(g) \rightarrow CO_2(g)$ | 2 | −257.274 | 1.333 |
| $N_2H_4$ | $N_2H_4(l) + O_2(g) \rightarrow N_2(g) + 2H_2O(l)$ | 4 | −623.723 | 1.616 |
| $NH_3$ | $NH_3(g) + \frac{3}{4}O_2(g) \rightarrow \frac{1}{2}N_2(g) + \frac{3}{2}H_2O(l)$ | 3 | −339.386 | 1.173 |

The electrolyte medium in the electrolyte chamber 115 can include one of several low melting or low liquidus temperature inorganic ionic liquids that cause the fuel cell 100 to offer performance comparable to the phosphoric acid fuel cell. Inorganic ionic liquids are liquid below 100° C. The availability of inorganic ionic liquids that are liquid below 100° C. is increased when proton transfer salts are included. The low melting binary melts containing ammonium salts include $LiNO_3$—$NH_4NO_3$ that has a eutectic temperature of 98° C. Ammonium salts and their mixtures, as components of the electrolyte medium in the electrolyte chamber 115, provide high temperature stability and maximize the concentration of proton carriers. The electrolyte medium in the electrolyte chamber 115 can include salt mixtures that contain at least two salts, where each salt is chosen from the group consisting of one trifluoromethanesulfonate ($NH_4Tf$), ammonium trifluoroacetate ($NH_4TFAc$), and ammonium nitrate ($NH_4NO_3$). For example, an electrolyte medium can include one of three salt mixtures, where a first salt mixture can include $NH_4Tf$ and $NH_4TFAc$, a second salt mixture can include $NH_4Tf$ and $NH_4NO_3$, and a third salt mixture can include $NH_4TFAc$ and $NH_4NO_3$.

Figure 2:
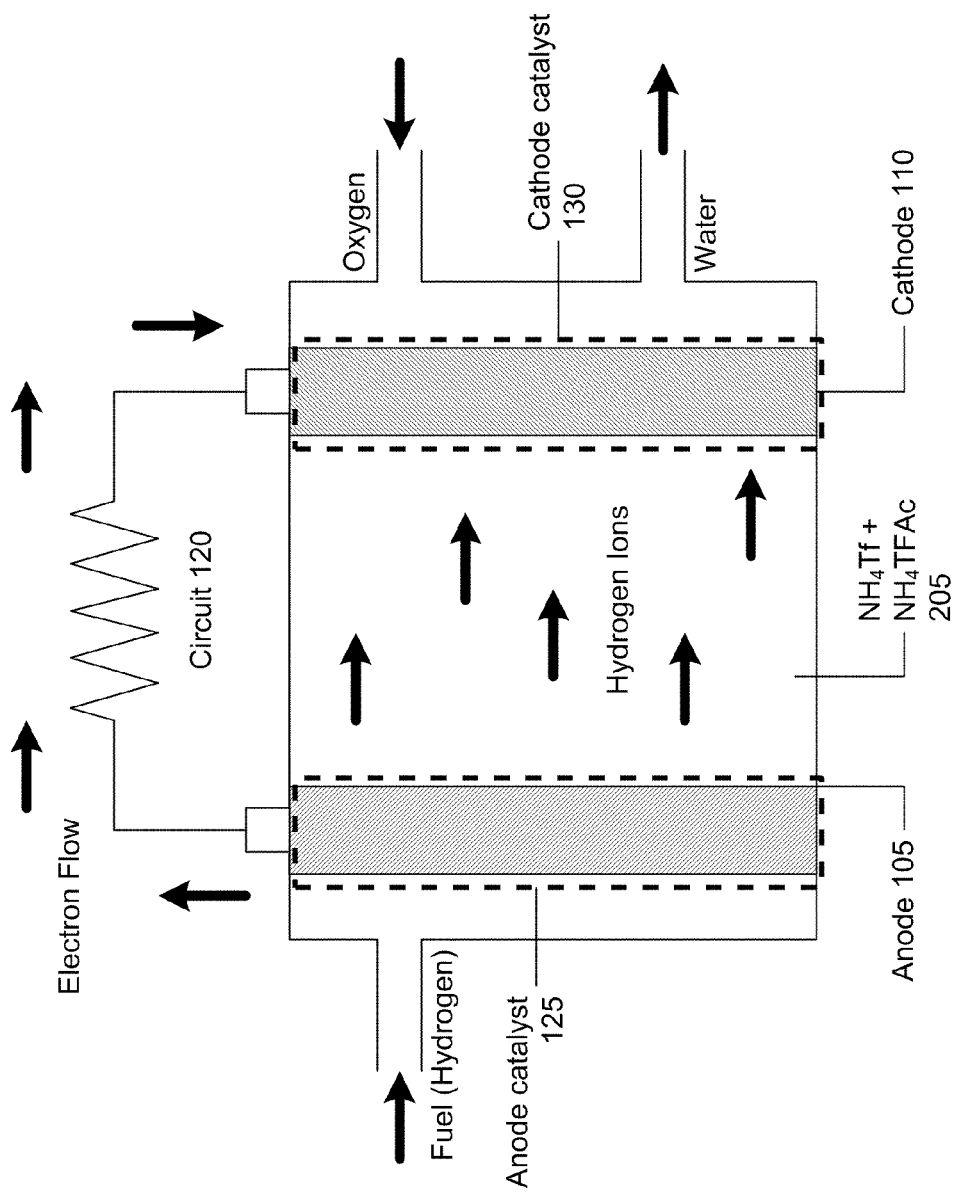
FIG. 2 is a schematic of an example of a fuel cell including a salt mixture comprising ammonium trifluoromethanesulfonate ($NH_4Tf$) and ammonium trifluoroacetate ($NH_4TFAc$) in an electrolyte medium.

FIG. 2 depicts a schematic of an example of a fuel cell 100 where the electrolyte medium in the electrolyte chamber includes the first salt mixture, namely a binary salt mixture consisting of $NH_4Tf$ and $NH_4TFAc$ 205. The first salt mixture has a eutectic temperature of 69° C. amounting to a freezing point lowering of some 50° C. from the melting point of the lower-melting of the two salts. The melting points ($T_m$) of a variety of ammonium salts are listed in Table 2, and eutectic temperatures ($T_e$) for some additional pairs are also listed.

TABLE 2

| Thermal properties of several ammonium salts | | |
|---|---|---|
| Salt and Anion formula | $T_m$, ° C. | $T_e$ ° C. with . . . |
| Ammonium triflate (Tf) $CF_3SO_3^-$ | 225 | 104 ($NH_4NO_3$) |
| "trifluoroacetate (TFAc) $CF_3COO^-$ | 125 | 69 ($NH_4Tf$) |
| Ammonium tetrafluoroborate $BF_4^-$ | 230 | 160 ($NH_4Tf$) |
| "methanesulfonate $CH_3SO_3^-$ | 183 | |
| Ammonium nitrate $NO_3^-$ | 169 | 79 ($NH_4TFAc$) |
| Ammonium thiocyanate $SCN^-$ | 153 | 72 ($NH_4TFAc$) |

TABLE 2-continued

| Thermal properties of several ammonium salts | | |
|---|---|---|
| Salt and Anion formula | $T_m$, ° C. | $T_e$ ° C. with . . . |
| Ammonium sulfamate $SO_3NH_2^-$ | 133 | |
| Ammonium bifluoride $HF_2^-$ | 125 | |
| Ammonium hydrogen sulfate $HSO_4^-$ | 116 | |
| Ammonium bis(trifluoromethanesulfonyl)imide (TFSI) $(CF_3SO_2)_2N^-$ | 178 | 103 ($NH_4Tf$) |
| Ammonium bis(perfluoroethanesulfonylimide) (BETI) $(CF_3CF_2SO_2)_2N^-$ | 237 | 107 ($NH_4Tf$) |
| Hydrazinium nitrate | 70 | |

Figure 3:
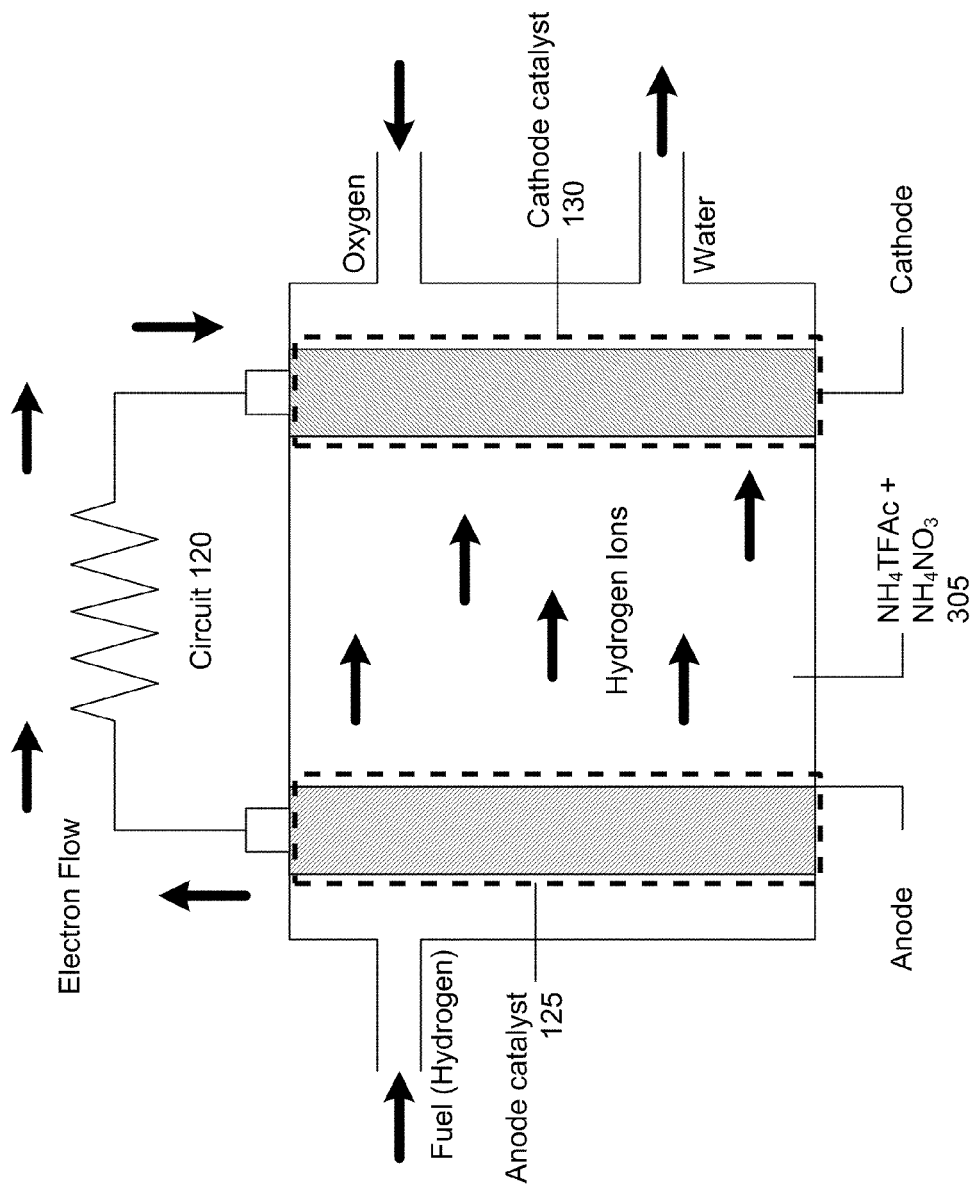
FIG. 3 is an example of a schematic of a fuel cell including a salt mixture comprising ammonium trifluoroacetate ($NH_4TFAc$) and ammonium nitrate ($NH_4NO_3$) in an electrolyte medium.
Figure 4:
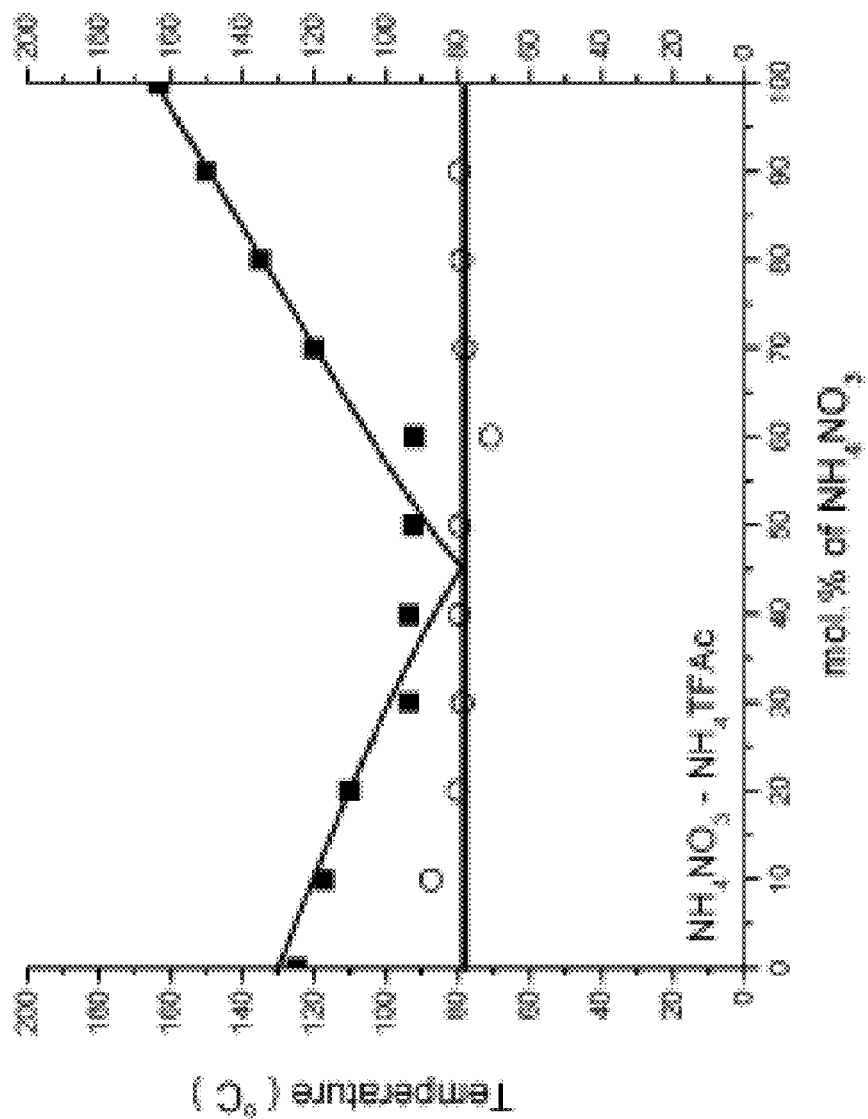
FIG. 4 is a phase diagram of a salt mixture containing $NH_4TFAc$ and $NH_4NO_3$.

FIG. 3 depicts a schematic of an example of a fuel cell where the electrolyte medium in the electrolyte chamber includes the second binary salt mixture consisting of $NH_4Tf$ and $NH_4NO_3$ 305. The eutectic temperature of the second binary salt mixture of $NH_4Tf$ and $NH_4NO_3$ is 79° C., and is greater than that of the first binary salt mixture. The phase diagram for the mixture of $NH_4Tf$ and $NH_4NO_3$ is shown in FIG. 4, which shows that the eutectic temperature lies at 79° C. The conductivities of the melts including ammonium salts are very high compared with those of most aprotic ionic liquids.

Figure 5:
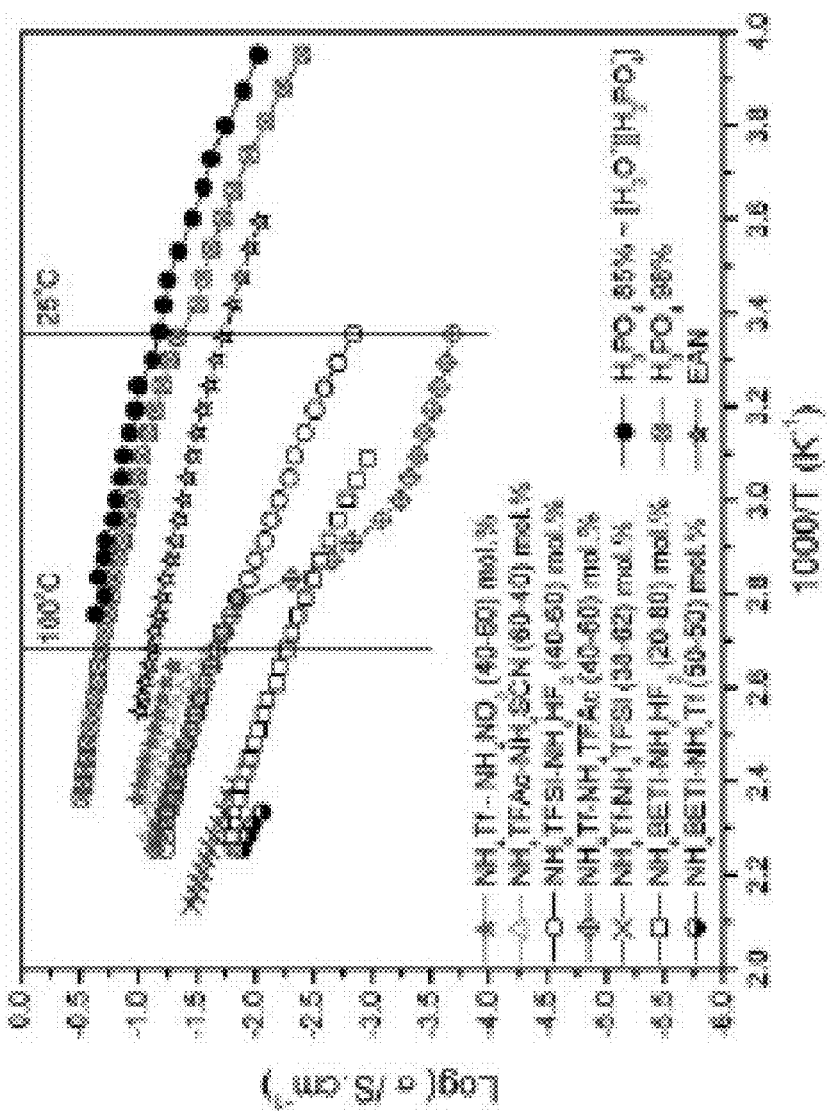
FIG. 5 is an Arrhenius plot of conductivities of ammonium salt mixtures.

FIG. 5 depicts an Arrhenius plot of conductivities of ammonium salt mixtures, where conductivities of binary salt mixtures, where each salt in the mixture contains an ammonium cation, are made with ethylammonium nitrate (EAN) and two phosphoric acids of different water content. High conductivity in solid state is shown for one case. The Arrhenius plot depicts data where comparison of the conductivities of a first binary salt mixture consisting of $NH_4Tf$ and $NH_4TFAc$, a second binary salt mixture consisting of $NH_4Tf$ and $NH_4NO_3$, and a third binary salt mixture consisting of $NH_4TFAc$ and $NH_4NO_3$ is made with that of EAN. At 150° C., the conductivity reaches values of 100 $mS.cm^{-1}$, comparable to those of aqueous solutions. Included in FIG. 5, are data for two phosphoric acid solutions of different water contents (85 wt % $H_3PO_4$ closely approximates the stoichiometry $[H_3O^-][H_2PO_4^-]$) which are higher-conducting because of their protonic acid character.

Figure 6:
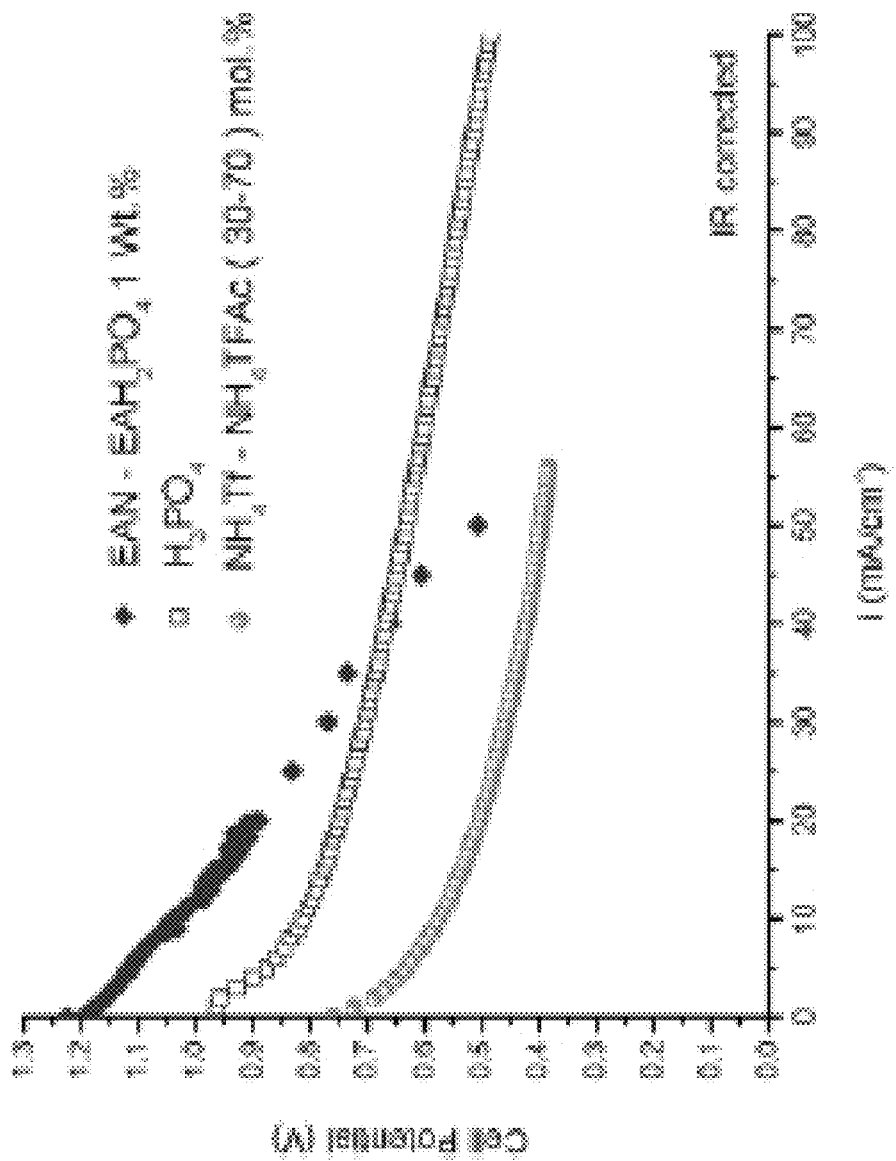
FIG. 6 is total polarization curves for fuel cell with salt mixture comprising $NH_4Tf$ and $NH_4TFAc$ as the electrolyte medium.

FIG. 6 depicts total polarization curves for a fuel cell 100 where the electrolyte medium in the electrolyte chamber includes a first binary salt mixture consisting of $NH_4Tf$ and $NH_4TFAc$. The plot compares the total polarization curve of the $NH_4Tf$-$NH_4TFAc$ electrolyte medium with those for phosphoric acid and dihydrogenphosphate-doped EAN, all measured in the same fuel cell 100. The curves have been IR corrected. Anode 105 and cathode 110 are platinum (Pt) catalyzed porous gas fed electrodes with Pt-loading of 0.5 $mg.cm^{-2}$, where the anode 105 was fed hydrogen, and the cathode 110 was fed oxygen. For the fuel cells with the different electrolyte media, current flowing under load when electrodes offered by E-TEK (Frankfurt am Main, Germany) are utilized in Teflon sandwich fuel cells. In FIG. 6, the upper curve shows the high voltage output of cells using electrolytes containing EAN, particularly when the EAN is doped with 1% ethylammonium dihydrogen phosphate to reduce its wetting of the E-TEK electrode. Fuel cells 100 using the binary ammonium salt mixture ($NH_4Tf$ and $NH_4TFAc$) in the electrolyte medium in the electrolyte chamber provide current at high load that is maintained in a manner comparable to that of the phosphoric acid fuel cell.

Figure 7:
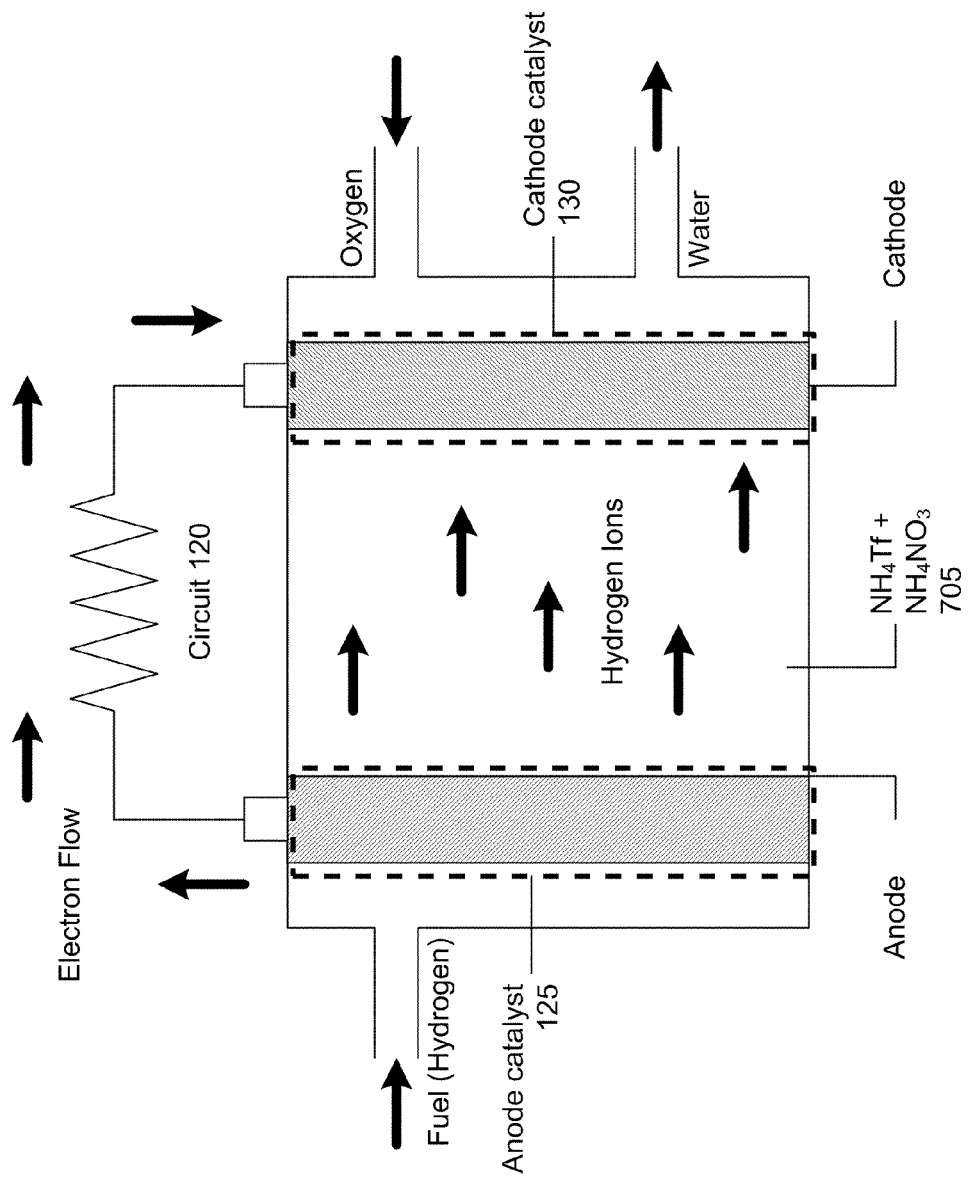
FIG. 7 is an example of a schematic of a fuel cell including a salt mixture comprising ammonium trifluoromethanesulfonate ($NH_4Tf$) and ammonium nitrate ($NH_4NO_3$) in an electrolyte medium.

FIG. 7 depicts a schematic of an example of a fuel cell 100 including a binary salt mixture consisting of $NH_4Tf$ and $NH_4NO_3$ 705 in the electrolyte medium in the electrolyte chamber.

Figure 8A:
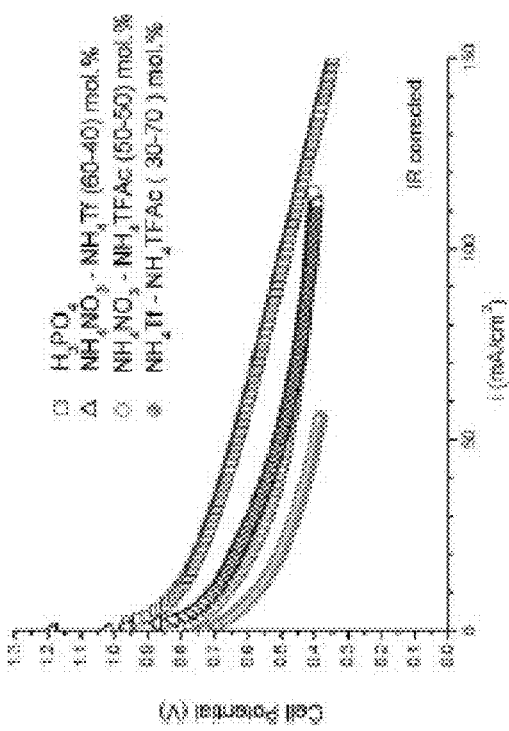
FIGS. 8A-8B are IR-corrected polarization curves for fuel cells using different electrolyte media.
Figure 8B:
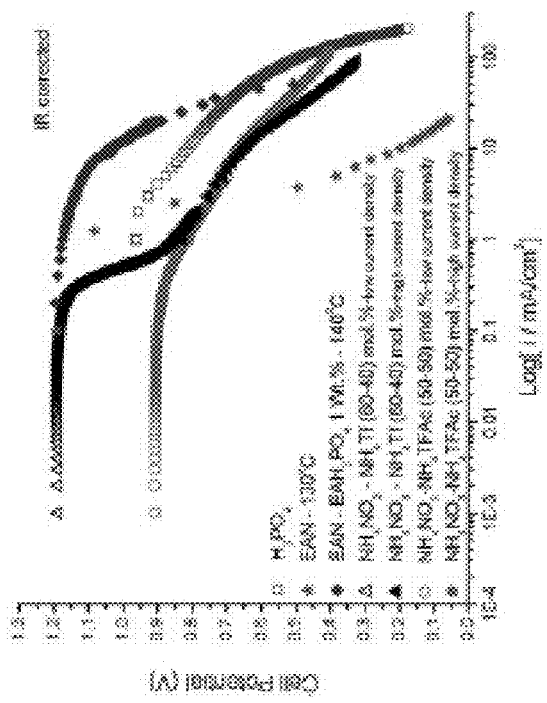

FIGS. 8A and 8B depict IR-corrected polarization curves for fuel cells using (1) EAN, (2) EAN doped with 1 wt % ethylammonium dihydrogen phosphate, (b) the two inorganic binary salt mixtures containing $NH_4NO_3$, shown in the Tafel plot form, fuel cell voltage vs/log current density. Overlap of data from independent runs using different current range instruments establishes reproducibility of behavior and plateau implies ideal (barrier-free) reduction at low current. Inorganic electrolytes with ammonium nitrate components were subjected to pre-tests for explosion potential, and found to be stable. The fuel cell 100 using the equimolar $NH_4NO_3$+$NH_4TFAc$ in the electrolyte medium was stable yielding invariant potential at fixed load for an extended period of fuel cell 100 use. The fuel cell 100 using 60:40 $NH_4NO_3$:$NH_4TFAc$ yielded an open circuit voltage of 1.20V, which was greater than the theoretical voltage of 1.15V at 150° C., due to the low product water activity. These and a number of additional cases are shown in FIG. 8A. The results for selected cases are shown in FIG. 8B in Tafel plot form, fuel cell voltage v.s log current density.

Figure 9:
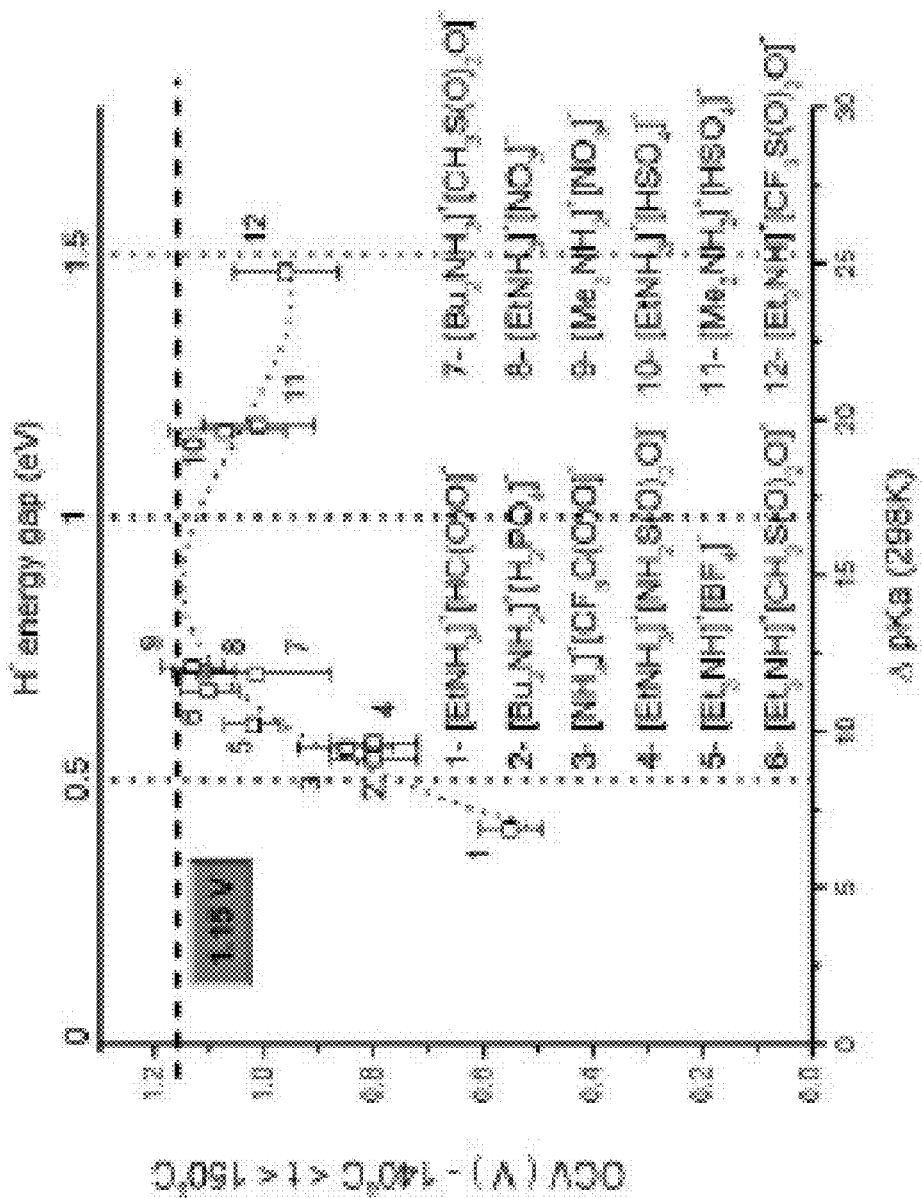
FIG. 9 are open circuit cell voltages in relation to the proton transfer energy gap.

FIG. 9 depicts open circuit cell voltages in relation to the proton transfer energy gap characterizing the protic ionic liquid electrolyte, showing the range of electrolytes that can yield theoretical fuel cell voltages. The plateau at 1.20V in the case of the binary salt mixture consisting of $NH_4Tf$ and $NH_4NO_3$ signifies ideal barrier-free electroreduction. It is postulated that on-catalyst abrosption is the reason that the voltage drops abruptly at current densities above 0.5 $mA.cm^{-2}$, but then resumes at a lower cell voltage. Fuel cell 100 voltages in the range of 1.15-1.20V need not be confined to nitrate anion-containing ionic liquids. Such levels of open circuit voltage can be obtained with protic ionic liquids that are formed by transfer of protons across a free energy gap of about 0.6-1.0 eV. FIG. 9 shows the relation between measured fuel cell open circuit voltage (OCV) and the proton energy gap between donor acid and acceptor base of the protic electrolyte which, by unproven assumption, is proportional to the aqueous solution metric $\Delta pK_a$. ($\Delta G_{(proton\ transfer)} = -2.303RT\Delta pK_a$). FIG. 9 suggests that there will be many protic salts which, used as liquid electrolytes, will yield high fuel cell OCV values.

Figure 10:
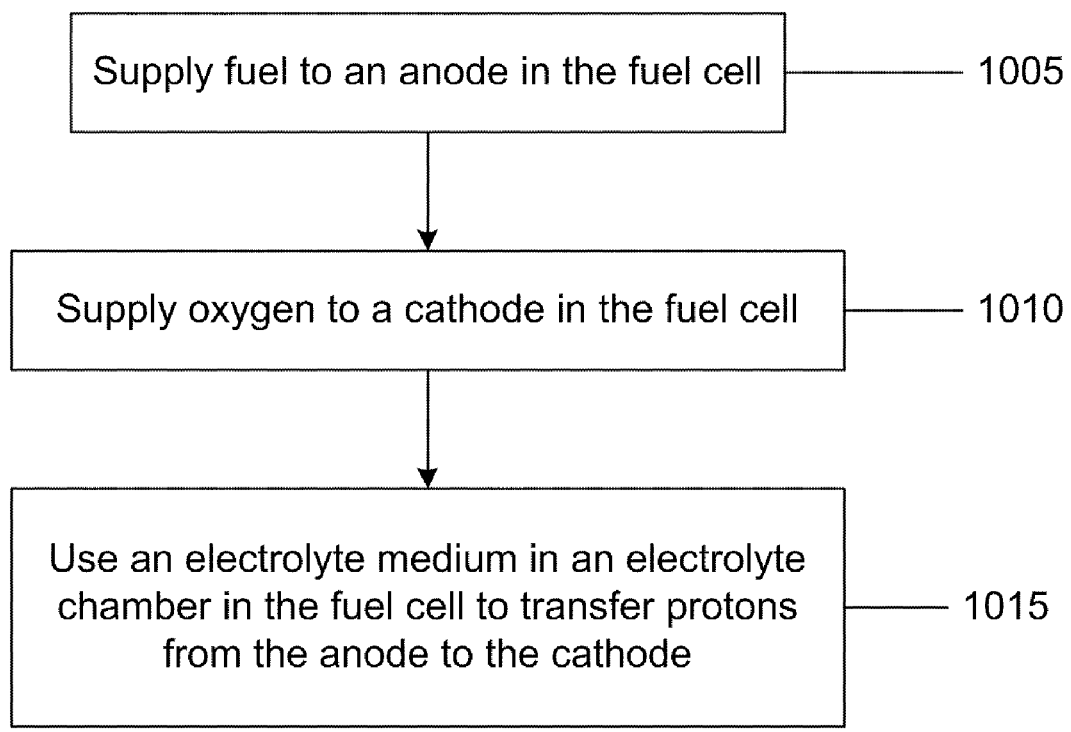
FIG. 10 is a flow chart of an example of a process for using inorganic salts containing ammonium cations in an electrolyte medium in a fuel cell.

FIG. 10 depicts a flow chart of an example of a process for using inorganic salts containing ammonium cations in an electrolyte medium in a fuel cell. Fuel can be supplied to an anode in the fuel cell 100 at. Oxygen can be supplied to the cathode in the fuel cell at 1010. When the hydrogen ($H_2$) in the fuel comes in contact with the anode catalyst 125, it splits into two $H^+$ ions and two electrons, $e^-$. The electrons are conducted through the anode 105 through the circuit 120, used to do work, e.g., operate a motor, and then returned to the cathode 110 of the fuel cell 100. When the oxygen ($O_2$) comes in contact with the cathode catalyst 130, it forms two oxygen atoms, each atom having a strong negative charge. An electrolyte medium in an electrolyte chamber in the fuel cell can transfer protons from the anode to the cathode. The negative charge attracts the two $H^+$ ions through the electrolyte medium in the electrolyte chamber 115, where the negative charge combines with an oxygen atom and two of the electrons from the circuit 120 to form a water molecule ($H_2O$). The reactions at the anode 105 and the cathode 110 are as follows:

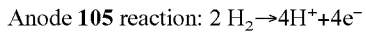
Anode 105 reaction: $2\ H_2 \rightarrow 4H^+ + 4e^-$
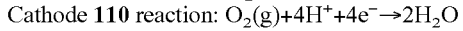
Cathode 110 reaction: $O_2(g) + 4H^+ + 4e^- \rightarrow 2H_2O$
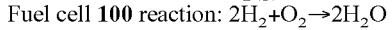
Fuel cell 100 reaction: $2H_2 + O_2 \rightarrow 2H_2O$ The electrolyte medium in the electrolyte chamber 115 in the fuel cell 100 can include an inorganic salt mixture, where the salt mixture can include pre-determined quantities of at least two salts chosen from a group consisting of ammonium trifluoromethanesulfonate, ammonium trifluoroacetate, and ammonium nitrate. In some implementations, the salt mixture can consist of $NH_4Tf$ and $NH_4TFAc$. In other implementations, the salt mixture can consist of $NH_4TFAc$ and $NH_4NO_3$. In other implementations, the salt mixture can consist of $NH_4NO_3$ and $NH_4Tf$. In such implementations, the salt mixture can consist of 60% $NH_4NO_3$ and 40% $NH_4Tf$ by weight.

While this specification contains many specifics, these should not be construed as limitations on the scope of the specification or of what may be claimed, but rather as descriptions of features specific to particular implementations of the specification. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

A number of implementations have been described. Nevertheless, it will be understood that various modifications may be made without departing from the spirit and scope of the disclosure. For example, the salt mixture in the electrolyte medium can include a liquid component to maintain a liquid state of the salt mixture even when the fuel cell is idle. Such liquid component need not contain an ammonium ion. In some implementations, the salt mixture can include more than two salts. For example, one inorganic salt mixture can include $NH_4Tf$, $NH_4TFAc$, and $NH_4NO_3$. Other salts that contain ammonium cations can also be used.

In some implementations, the electrolyte medium can include low-melting inorganic salts, such as those of the hydrazinium cation. In other implementations, components including inorganic cations like hydrazinium and derivatives, such as methyl hydrazinium, can be used in the electrolyte medium. Such components can be liquid at room temperature. In addition, the electrolyte medium can contain the protonated products of other inorganic molecules that contain at least one of N, NH, and $NH_2$. In such implementations, one or more salts in the salt mixture of the electrolyte medium can be formed by a transfer of a proton to a nitrogenic inorganic base, e.g., hydrazine, methyl hydrazine, and any inorganic species with basic nitrogen atoms, e.g., fluorosulfonylamine. Accordingly, other implementations are within the scope of the following claims.

What is claimed is:

1. A system for converting chemical energy into electrical energy, the system comprising:
   a fuel cell comprising:
      an anode to receive a fuel;
      a cathode to receive oxygen; and
      an electrolyte chamber in the fuel cell, including an electrolyte medium in contact with the anode and the cathode, the electrolyte medium comprising an inorganic salt mixture, the salt mixture comprising pre-determined quantities of at least two salts chosen from a group consisting of ammonium trifluoromethanesulfonate ($NH_4Tf$), ammonium trifluoroacetate ($NH_4TFAc$), and ammonium nitrate ($NH_4NO_3$), to conduct charge from the anode to the cathode, and
   an electrical circuit operatively coupled to the fuel cell to conduct electric current from the anode to the cathode.

2. The system of claim 1, wherein the salt mixture consists of $NH_4Tf$ and $NH_4TFAc$.

3. The system of claim 1, wherein the salt mixture consists of $NH_4TFAc$ and ammonium nitrate $NH_4NO_3$.

4. The system of claim 1, wherein the salt mixture consists of $NH_4Tf$ and ammonium nitrate $NH_4NO_3$.

5. The system of claim 4, wherein the salt mixture consists of 60% $NH_4NO_3$ and 40% $NH_4Tf$ by weight.

6. The system of claim 1, wherein the electrolyte medium comprises a liquid component.

7. The system of claim 6, wherein the liquid component is free of ammonium.

8. The system of claim 1, wherein the salt mixture comprises one or more additional salts, each additional salt comprising an ammonium cation.

9. An electrolyte medium for conducting charge from an anode to a cathode in a fuel cell, the electrolyte medium comprising an inorganic salt mixture comprising at least two salts chosen from a group consisting of ammonium trifluoromethanesulfonate ($NH_4Tf$), ammonium trifluoroacetate ($NH_4TFAc$), and ammonium nitrate ($NH_4NO_3$).

10. The electrolyte medium of claim 9, wherein the salt mixture consists of $NH_4Tf$ and $NH_4TFAc$.

11. The electrolyte medium of claim 9, wherein the salt mixture consists of $NH_4TFAc$ and ammonium nitrate $NH_4NO_3$.

12. The electrolyte medium of claim 9, wherein the salt mixture consists of $NH_4Tf$ and $NH_4NO_3$.

13. The electrolyte medium of claim 12, wherein the salt mixture comprises 60% $NH_4NO_3$ and 40% $NH_4Tf$ by weight.

14. The electrolyte medium of claim 8, further comprising a liquid component.

15. The electrolyte medium of claim 14, wherein the liquid component is free of ammonium.

16. The electrolyte medium of claim 9, wherein the salt mixture comprises one or more additional salts, each additional salt comprising an ammonium cation.

17. A method of converting chemical energy into electrical energy in a fuel cell, the method comprising:
   supplying a fuel to an anode in the fuel cell;
   supplying oxygen to a cathode in the fuel cell; and
   placing an electrolyte medium in an electrolyte chamber in the fuel cell, the electrolyte medium in contact with the anode and the cathode, the electrolyte medium comprising an inorganic salt mixture, the salt mixture comprising pre-determined quantities of at least two salts chosen from a group consisting of ammonium trifluoromethanesulfonate ($NH_4Tf$), ammonium trifluoroacetate ($NH_4TFAc$), and ammonium nitrate ($NH_4NO_3$), to conduct charge from the anode to the cathode.

18. The method of claim 17, wherein the salt mixture consists of $NH_4Tf$ and $NH_4TFAc$.

19. The method of claim 17, wherein the salt mixture consists of $NH_4TFAc$ and $NH_4NO_3$.

20. The method of claim 17, wherein the salt mixture consists of $NH_4Tf$ and $NH_4NO_3$.

21. The method of claim 20, wherein the salt mixture consists of 60% $NH_4NO_3$ and 40% $NH_4Tf$ by weight.

22. The method of claim 17, wherein the electrolyte medium comprises a liquid component in the salt mixture.

23. The method of claim 22, wherein the liquid component is free of ammonium.

24. The method of claim 17, wherein the salt mixture comprises one or more additional salts, each additional salt comprising an ammonium cation.

25. A fuel cell comprising:
   an anode to receive a fuel;
   a cathode to receive oxygen; and
   an electrolyte chamber in the fuel cell, including an electrolyte medium in contact with the anode and the cathode, the electrolyte medium comprising an inorganic salt mixture, the salt mixture comprising pre-determined quantities of at least two salts chosen from a group consisting of ammonium trifluoromethanesulfonate ($NH_4Tf$), ammonium trifluoroacetate ($NH_4TFAc$), and ammonium nitrate ($NH_4NO_3$), to conduct charge from the anode to the cathode.

26. The fuel cell of claim 25, wherein the salt mixture consists of $NH_4Tf$ and $NH_4TFAc$.

27. The fuel cell of claim 25, wherein the salt mixture consists of $NH_4TFAc$ and ammonium nitrate $NH_4NO_3$.

28. The fuel cell of claim 25, wherein the salt mixture consists of $NH_4Tf$ and ammonium nitrate $NH_4NO_3$.

29. The fuel cell of claim 28, wherein the salt mixture consists of 60% $NH_4NO_3$ and 40% $NH_4Tf$ by weight.

30. The fuel cell of claim 25, wherein the electrolyte medium comprises a liquid component.

31. The fuel cell of claim 30, wherein the liquid component does not include ammonium.

32. The fuel cell of claim 25, wherein the salt mixture comprises one or more additional salts, each additional salt comprising an ammonium cation.

33. A system for converting chemical energy into electrical energy, the system comprising:
- a fuel cell comprising:
    - an anode to receive a fuel;
    - a cathode to receive oxygen; and
    - an electrolyte chamber in the fuel cell, including an electrolyte medium in contact with the anode and the cathode, the electrolyte medium comprising an inorganic salt mixture, the salt mixture comprising predetermined quantities of at least two salts chosen from a group consisting of ammonium trifluoromethanesulfonate ($NH_4Tf$), ammonium trifluoroacetate ($NH_4TFAc$), and ammonium nitrate ($NH_4NO_3$), wherein the salts are proton transfer salts comprising a protonated nitrogenic inorganic base, to conduct charge from the anode to the cathode; and
- an electrical circuit operatively coupled to the fuel cell to conduct electric current from the anode to the cathode.

34. A system for converting chemical energy into electrical energy, the system comprising:
- a fuel cell comprising:
    - an anode to receive a fuel;
    - a cathode to receive oxygen; and
    - an electrolyte chamber in the fuel cell, including an electrolyte medium in contact with the anode and the cathode, the electrolyte medium comprising an inorganic salt mixture, the salt mixture comprising predetermined quantities of at least two salts, wherein the salts are proton transfer salts comprising a protonated nitrogenic inorganic base, to conduct charge from the anode to the cathode, wherein the nitrogenic inorganic base comprises one of hydrazine, methyl hydrazine, and fluorosulfonylamine; and
- an electrical circuit operatively coupled to the fuel cell to conduct electric current from the anode to the cathode.

* * * * *